(12) United States Patent
Eick et al.

(10) Patent No.: US 7,484,522 B2
(45) Date of Patent: Feb. 3, 2009

(54) METHOD TO CONTROL STARTER/GENERATOR COOLING FUEL FLOW DURING ENGINE STARTING

(75) Inventors: Chris D. Eick, Phoenix, AZ (US); Paul W. Futa, Jr., North Liberty, IN (US); Mitchell J. Laidlaw, Tempe, AZ (US); Anthony C. Libera, Tempe, AZ (US); Donald M. Purcell, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 647 days.

(21) Appl. No.: 11/040,745

(22) Filed: Jan. 21, 2005

(65) Prior Publication Data
US 2006/0081222 A1    Apr. 20, 2006

Related U.S. Application Data

(60) Provisional application No. 60/620,634, filed on Oct. 19, 2004.

(51) Int. Cl.
*F02M 37/00* (2006.01)
(52) U.S. Cl. .................... 137/14; 137/488; 137/614.21; 123/514
(58) Field of Classification Search ............ 137/614.21, 137/485, 488, 12, 14; 123/514, 541
See application file for complete search history.

(56) References Cited

U.S. PATENT DOCUMENTS

| | | | |
|---|---|---|---|
| 1,938,077 A | 12/1933 | Lysholm | |
| 2,934,655 A | 4/1960 | Heller et al. | |
| 2,970,232 A | 1/1961 | Kilbourne | |
| 2,975,308 A | 3/1961 | Kilbourne et al. | |
| 3,089,045 A | 5/1963 | Derks | |
| 3,711,731 A | 1/1973 | Pluschke | |
| 3,755,702 A | 8/1973 | Willyoung | |
| 4,228,374 A | 10/1980 | Elsel | |
| 4,241,269 A | 12/1980 | Antonov et al. | |
| 4,337,617 A | 7/1982 | Smith | |

(Continued)

FOREIGN PATENT DOCUMENTS

WO    99/32772 A1    7/1999

(Continued)

OTHER PUBLICATIONS

EP Search Report No. 05256532.2.

*Primary Examiner*—Kevin L Lee
(74) *Attorney, Agent, or Firm*—Ingrassia Fisher & Lorenz, P.C.

(57) ABSTRACT

The present invention provides a relatively simple way to automatically turn on and off the fuel to a starter/generator cooling system during engine start. The present invention takes advantage of a fuel pressure rise provided by an engine fuel boost pump during the period from engine start to engine idle conditions. This pressure rise is used to stroke a shutoff valve in a fuel return to tank valve (FRTTV), which shuts off the starter generator cooling fuel flow. This shutoff occurs automatically with no other external input from, for example, an engine controller. A check valve is also included that prevents back flow through the FRTTV in the event of an engine start with no aircraft pumps running.

39 Claims, 2 Drawing Sheets

U.S. PATENT DOCUMENTS

| | | |
|---|---|---|
| 4,753,284 A | 6/1988 | Krause et al. |
| 4,782,809 A * | 11/1988 | Kotowski et al. ............ 123/531 |
| 4,825,899 A | 5/1989 | Niggermann |
| 4,837,469 A | 6/1989 | Ward |
| 5,517,072 A | 5/1996 | Hildebrandt |
| 5,698,912 A | 12/1997 | Rasch et al. |
| 6,182,435 B1 | 2/2001 | Niggemann et al. |
| 6,424,062 B1 | 7/2002 | Adelmann et al. |
| 6,460,324 B1 | 10/2002 | Rakhmailov |
| 6,583,525 B2 | 6/2003 | Dyer et al. |

FOREIGN PATENT DOCUMENTS

| | | |
|---|---|---|
| WO | 02/01055 A1 | 1/2002 |

* cited by examiner

METHOD TO CONTROL STARTER/GENERATOR COOLING FUEL FLOW DURING ENGINE STARTING

CROSS-REFERENCE TO RELATED APPLICATION

This application claims the benefit of U.S. Provisional Application No. 60/620,634, filed Oct. 19, 2004.

TECHNICAL FIELD

The present invention relates to electric starter generators and, more particularly, to cooling an electric starter generator during engine start.

BACKGROUND

Various aircraft are being designed to use electric starter generators (S/G) rather than air turbine starters to start the engines. These S/Gs can generate significant heat during start and need to be cooled. One way to cool S/Gs is to use fan flow, but if fan flow is not available (such as during a ground start), fuel may be used to provide cooling during start. An S/G cooling system must be able to control the fuel flow used for cooling. During engine start, one of the conventional ways to turn flow on and off in the S/G cooling system is through the use of a solenoid valve. However, this can be relatively expensive, heavy, and can consume significant electrical power.

Accordingly, there is a need for a simple S/G cooling system that can provide S/G cooling during engine starting without the use of a solenoid valve. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a relatively simple way to automatically turn on and off the fuel to an S/G cooling system during engine start. The present invention takes advantage of a fuel pressure rise provided by an engine fuel boost pump during the period from engine start to engine idle conditions. This pressure rise is used to stroke a mechanical shutoff valve in a fuel return to tank valve (FRTTV), which shuts off the starter generator cooling fuel flow. This shutoff occurs automatically with no other external input from, for example, an engine controller (e.g., a Full-Authority Digital Electronic Control (FADEC)). Moreover, pressure switches may be used to inform the FADEC if fuel is flowing to the heat exchangers through the FRTTV. A check valve is also included that prevents back flow through the system in the event of an engine start with no aircraft pumps running. Significant cost, weight, and power savings, and FADEC/wiring harness simplifications may be seen as a result.

In one embodiment, and by way of example only, a FRTTV is disclosed for use in an electric S/G cooling system that includes an S/G fuel oil heat exchanger for cooling S/G oil during engine start. The FRTTV includes a housing having an inlet and an outlet in fluid communication with a fuel tank. A seat is positioned between the inlet and outlet. Fluid flowing from the inlet to the outlet in the FRTTV flows through the seat. A shutoff valve in the FRTTV is movable from a fuel flow position, with the shutoff valve away from the seat, to a fuel shutoff position, with the shutoff valve against the seat. The FRRTV also includes a signal pressure inlet that is connected to the shutoff valve. The signal pressure inlet is able to sense engine fuel pressure rise from an engine fuel boost pump. As the engine fuel pressure rises, the shutoff valve is urged from the fuel flow position to the fuel shutoff position.

In another embodiment, and by way of example only, a method is disclosed to automatically turn on and off fuel to an S/G cooling system using a FRTTV coupled to an engine fuel boost pump during engine start. The method includes aircraft boost pump fuel flowing into the FRTTV and opening the FRRTV based on the aircraft boost pump fuel pressure rise. The FRTTV also senses fuel discharge pressure rise from engine fuel boost pump. The FRRTV may close based on the sensed fuel pressure rise.

Other independent features and advantages will become apparent from the following detailed description, taken in conjunction with the accompanying drawings which illustrate, by way of example, the principles of the invention.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
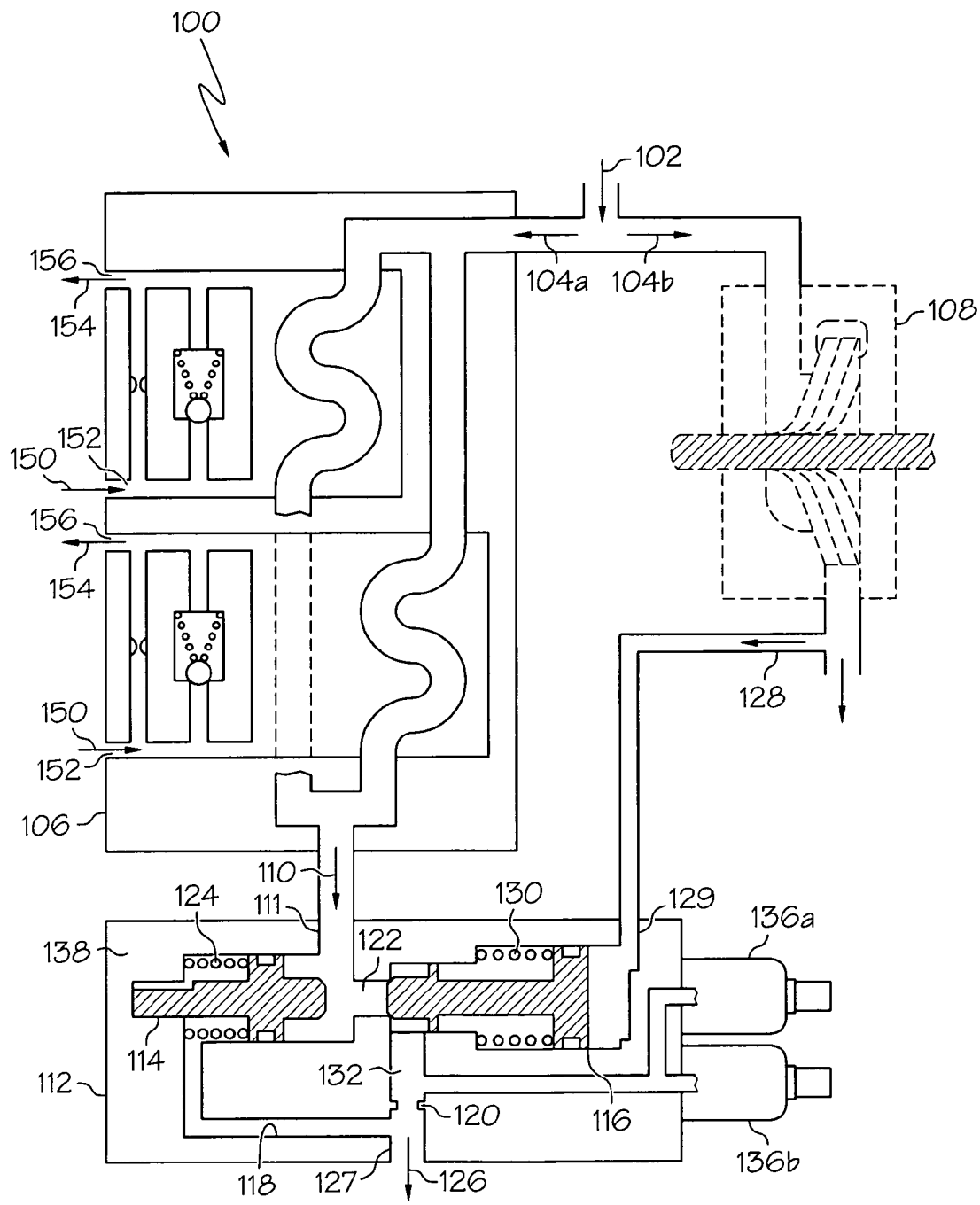
FIG. 1 is a schematic diagram of a heat exchanger fuel system.

FIG. 1 is a schematic diagram of a heat exchanger fuel system 100 for cooling oil from an electric starter/generator (S/G) used to start an aircraft engine. The heat exchanger fuel system 100 includes a S/G fuel oil heat exchanger that receives aircraft boost flow 102 from an aircraft boost pump (not shown) and a fuel return to tank valve (FRTTV) 112.

The S/G fuel oil heat exchanger 106 is used to cool the S/G (not shown). The principles of heat exchangers are well known and need not be discussed in detail. In the figure, Hot S/G oil 150 from the electric S/G enters an inlet 152 of the heat exchanger. As the S/G oil travels through the S/G fuel oil heat exchanger 106, heat is transferred to the fuel flow 104a, cooling the S/G oil where the cool S/G oil 154 exits at an outlet 156 and returns to the starter/generators. While the S/G fuel oil heat exchanger 106 shown in the figure cools two S/Gs, more or less may be used.

Figure 2:
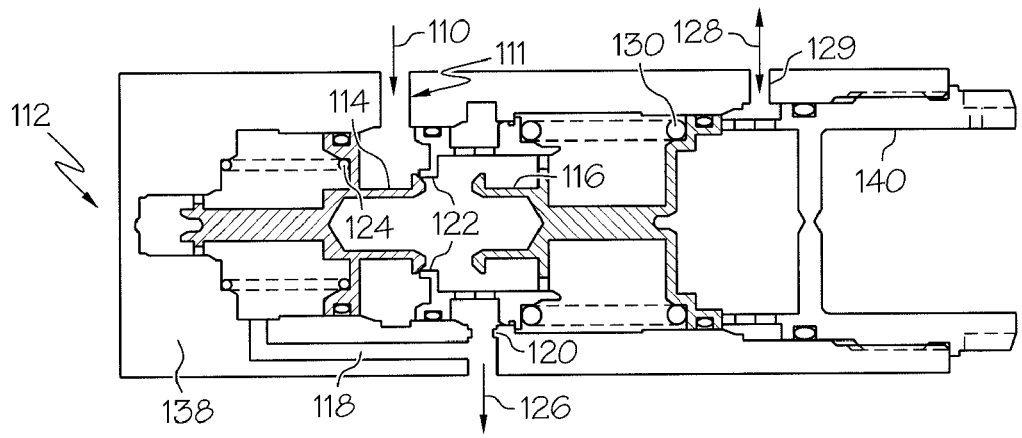
FIG. 2 is a cross-sectional view of an FRTTV in a closed position in engine shutdown mode.

The FRTTV 112 includes a check valve 114 and a shutoff valve 116. The check valve 114 is included so that in the event of, for example, an aircraft boost pump malfunction, reverse fuel flow is prevented. In the depicted embodiment, the check valve 114 architecture incorporates a 45 degree hard seat engaging a 0.563 diameter seat 122. The check valve 114 includes a 1.125 diameter piston with a Teflon cap seal. This piston area provides 17 pounds of force, which works against a 7.5 pound spring pre-load by spring 124. The check valve 114 is normally closed against the seat 122 until there is a pressure flow 110 to open it (as shown in FIG. 2). The piston architecture allows the check valve 114 to have much greater force margin than what is normally achieved in a check valve. Configuring the check valve 114 to latch in the open position minimizes pressure drop through the FRTTV 112. The check valve 114 may also include a guide stem with three flats. Having flats on the guide provides an area for contamination to escape, preventing the valve from binding. The Teflon cap seal prevents flow across the piston, preventing contamination from collecting in the diametrical clearance.

The FRTTV 112 also includes the shutoff valve 116 that allows flow 126 to a fuel tank when engine speed is less than idle, and shuts flow to the fuel tank when the engine reaches idle speed. In the depicted embodiment, the shutoff valve 116 architecture has a 45 degree hard seat that engages the opposite side of the 0.563 diameter seat 122 than the check valve 114. A spring 130 is used to hold the shutoff valve 116 normally open with a 30 pound pre-load (as shown in FIG. 2). The depicted shutoff valve 116 includes a 1.313 diameter piston with a Teflon cap seal. The shutoff valve 116 also includes a guide diameter with four flats. Having flats on the guide provides an area for contamination to escape, preventing the valve from binding. The Teflon cap seal prevents flow across the piston, preventing contamination from collecting in the diametrical clearance.

In use, aircraft boost pump fuel flow 102 enters the heat exchanger fuel system 100 from an aircraft boost pump (not shown). The aircraft boost pump fuel flow 102 is then split, with a first portion of the flow 104a entering the S/G fuel oil heat exchanger 106 and a second portion of the flow 104b entering an engine main fuel boost centrifugal pump 108. As the flow 104b travels through the S/G fuel oil heat exchanger 106, heat is transferred to the flow 104a from the hot S/G oil 150. Warm flow 110 exits the S/G fuel oil heat exchanger 106 and enters the FRTTV 112 at inlet 111. The flow pressure of the flow 104a entering the S/G fuel oil heat exchanger 106 may be approximately 20 PSIG and the flow 110 exiting the S/G fuel oil heat exchanger 106 may be approximately 17 PSIG (about a 3 psid inlet to outlet pressure drop). The flow 110 exiting the S/G fuel oil heat exchanger 106 enters the fuel return to tank valve (FRTTV) 112. The pressure pushes the check valve 114 open to the fuel flow position (the position shown in FIG. 1, see also FIG. 3). The backside of the check valve 114 is referenced to fuel tank return pressure 118, which is at atmospheric pressure. With the check valve 114 open, fuel flows through the seat 122, through a metering orifice 120, and is then returned 126 to the fuel tank through an outlet 127. As the engine increases speed, fuel pressure rises across this centrifugal boost pump 108, the shutoff valve 116 receives a signal pressure 128 from an aircraft centrifugal boost pump 108 at a signal pressure inlet 129 (see also FIG. 4). The signal pressure inlet 129 is separated from the cooling flow 110 by the piston and seal of the shutoff valve. At approximately 50 psid of signal pressure 128 rise, the pressure 128 acts on the piston area of the shutoff valve 116 to create approximately 70 pounds of force, closing the shutoff valve 116 by pressing it against the seat 122 (the position shown in FIG. 1, see also FIG. 4). It should be noted that over 30 pounds of force margin is available to move the shutoff valve 116 either direction.

In the depicted embodiment, the metering orifice 120, which is located downstream of the shutoff valve 116, is comprised of a 0.3125 diameter hole machined directly in the FRTTV 112 housing 138. It is sized to flow 3300 PPH fuel at 15 psid. The pressure in a chamber 132 bounded by the shutoff valve 116 and metering orifice 120 is routed within a passage 134 to two pressure switches 136a and 136b. These pressure switches 136a and 136b provide feedback to the FADEC on whether or not the FRTTV 112 is flowing. If the shutoff valve 116 is open and flowing, the pressure in this chamber 132 will be at 15 PSIG, and will close the electronic circuit in the two pressure switches 136a and 136b. If the shutoff valve 116 is closed, the pressure in this chamber 132 will fall to atmospheric tank pressure, and the circuit on the two pressure switches 136a and 136b will open. In the depicted embodiment, the two pressure switches 136a and 136b close the circuit at 8 PSIG, and open the circuit at 6 PSIG, but may be designed for any open or close pressure.

FIG. 2 is a cross-sectional view showing one embodiment of the FRTTV 112. The FRTTV 112 architecture incorporates a single centerline valve assembly (single bore in housing 138). Both the check valve 114 and shutoff valve 116 are a sleeveless design, operating directly in the housing bore. The valves 114, 116 and seat 122 are fabricated from corrosion resistant steel, and the housing 138 is fabricated of aluminum alloy. The bore in the housing 138 has a heavy hard coat surface on the surfaces that contact the moving check valve 114 and the shutoff valve 116. The seat 122 is a unique design, serving as the seat for both the check valve 114 and the shutoff valve 116, the check valve 114 being on the inlet 111 side of the seat 122 and the shutoff valve 116 being on the outlet 129 side of the seat 122. The seat 122 is retained by the shutoff valve load spring 130, minimizing parts which simplifies the design. A single cover 140 fabricated of aluminum alloy retains the valve assembly.

FIG. 2 shows the FRTTV 112 in a closed position in engine shutdown mode. In this mode, there is no flow 110 exiting the S/G fuel oil heat exchanger, so the spring 124 pushes the check valve 114 to its normally closed position against the seat 122, thereby preventing fluid flow through the seat 122. There is also no signal pressure 128 coming from the engine centrifugal boost pump 108, so the shutoff valve 116 is in the normally open position being held there by spring 130.

Figure 3:
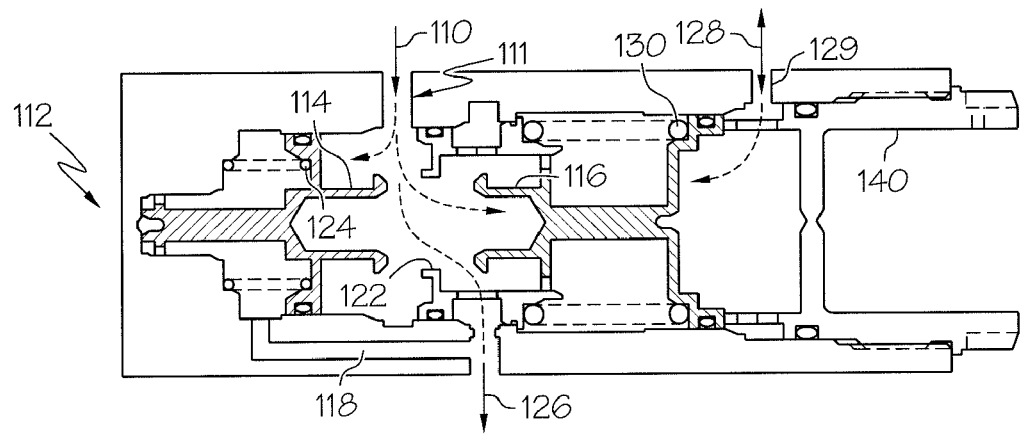
FIG. 3 is a cross-sectional view showing the FRTTV in an open or flowing position during engine start mode.

FIG. 3 is a cross-sectional view showing the FRTTV 112 in an open or flowing position during engine start mode. While the engine is started, flow 110 exiting the S/G fuel oil heat exchanger enters the FRTTV 112 at approximately 17 PSIG and applies pressure to the check valve face and latches the check valve 114 open away from the seat 122. The fluid is allowed to flow through the seat 122 and return 126 to the fuel tank. There is some signal pressure 128 coming from the aircraft centrifugal boost pump 108, but during engine startup the pressure rise is below 50 psid, which is not enough to overcome the spring 130 pressure to close the shutoff valve 116 against the seat 122.

Figure 4:
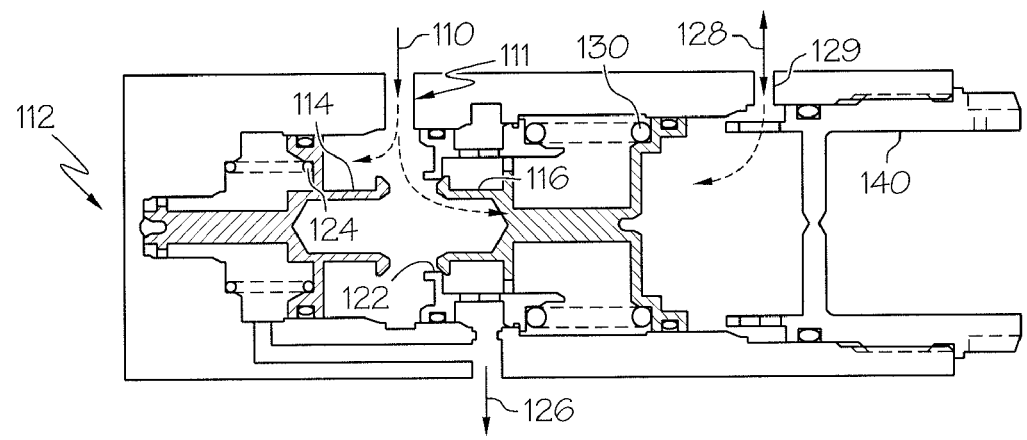
FIG. 4 is a cross-sectional view showing the FRTTV in a closed or shutoff position during engine run mode.

FIG. 4 is a cross-sectional view showing the FRTTV 112 in a closed or shutoff position during engine run mode. As the engine speed increases, fuel or signal pressure 128 rises approximately 50 psid from the engine centrifugal boost pump 108. This pressure 128 acts on the piston area of the shutoff valve 116 to create approximately 70 pounds of force, closing the shutoff valve 116 against seat 122 preventing fluid flow. There is still flow 110 entering the FRTTV 112 keeping the check valve 114 open, but since the shutoff valve 116 is against the other side of the seat 122, fluid may not flow through the FRTTV.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A fuel return to tank valve (FRTTV) for use in an electric starter/generator (S/G) cooling fuel flow system having a S/G fuel oil heat exchanger for cooling S/G oil during engine start, the FRTTV comprising:
    a housing having an inlet, an outlet and a seat positioned between the inlet and the outlet, the inlet being in fluid communication with the outlet through the seat;
    a shutoff valve moveably positioned within the housing configured to move between a fuel flow position away from the seat and a fuel shutoff position against the seat;
    a fuel signal pressure inlet coupled to the shutoff valve, the fuel signal pressure inlet being configured to sense fuel pressure rise from an engine fuel boost pump to urge the shutoff valve from the fuel flow position to the fuel shutoff position; and
    a shutoff valve spring coupled to the shutoff valve, the shutoff valve spring being configured to urge the shutoff valve away from the seat.

2. The FRTTV of claim 1, wherein the inlet is configured to receive fluid from the S/G fuel oil heat exchanger.

3. The FRTTV of claim 1, wherein the outlet is configured to exit fuel to a fuel tank.

4. The FRTTV of claim 1, wherein the shutoff valve is configured to move to the fuel shutoff position at approximately 50 psid of sensed fuel pressure rise.

5. The FRTTV of claim 1, wherein the shutoff valve spring provides a 30 pound pre-load on the shutoff valve.

6. A fuel return to tank valve (FRTTV) for use in an electric starter/generator (S/G) cooling fuel flow system having a S/G fuel oil heat exchanger for cooling S/G oil during engine start, the FRTTV comprising:
    a housing having an inlet, an outlet and a seat positioned between the inlet and the outlet, the inlet being in fluid communication with the outlet through the seat;
    a shutoff valve moveably positioned within the housing configured to move between a fuel flow position away from the seat and a fuel shutoff position against the seat;
    a fuel signal pressure inlet coupled to the shutoff valve, the fuel signal pressure inlet being configured to sense fuel pressure rise from an engine fuel boost pump to urge the shutoff valve from the fuel flow position to the fuel shutoff position; and
    a moveable check valve configured to move between a fuel shutoff position against the seat and a fuel flow position away from the seat.

7. The FRTTV of claim 6, wherein the check valve is positioned on the inlet side of the seat and the shutoff valve is positioned on the outlet side of the seat.

8. The FRTTV of claim 6, wherein the position of the check valve is based on fuel flow pressure in the inlet.

9. The FRTTV of claim 8, wherein the check valve is configured to move to the fuel flow position at approximately 17 psid of fuel flow pressure.

10. The FRTTV of claim 6, further comprising a check valve spring coupled to the check valve, the check valve spring being configured to urge the check valve toward the seat.

11. The FRTTV of claim 10, wherein the check valve spring provides a 7.5 pound preload on the check valve.

12. A fuel return to tank valve (FRTTV) for use in an electric starter/generator (S/G) cooling fuel flow system having a S/G fuel oil heat exchanger for cooling S/G oil during engine start, the FRTTV comprising:
    a housing having an inlet, an outlet and a seat positioned between the inlet and the outlet, the inlet being in fluid communication with the outlet through the seat;
    a shutoff valve moveably positioned within the housing configured to move between a fuel flow position away from the seat and a fuel shutoff position against the seat;
    a fuel signal pressure inlet coupled to the shutoff valve, the fuel signal pressure inlet being configured to sense fuel pressure rise from an engine fuel boost pump to urge the shutoff valve from the fuel flow position to the fuel shutoff position; and
    a metering orifice positioned between the shutoff valve and the outlet.

13. The FRTTV of claim 12, wherein the metering orifice is sized to flow 3300 PPH fuel at 15 psid.

14. The FRTTV of claim 12, further comprising a chamber bounded by the shutoff valve and metering orifice.

15. The FRTTV of claim 14, further comprising one or more pressure switches fluidly coupled to the chamber, the one or more pressure switches configured to sense fuel flow in the chamber.

16. A fuel return to tank valve (FRTTV) for use in an electric starter/generator (S/G) cooling fuel flow system having a S/G fuel oil heat exchanger for cooling S/G oil during engine start, the FRTTV comprising:
    a housing having a inlet in fluid communication with the S/G fuel oil heat exchanger, a outlet in fluid communication with a fuel tank, and a seat positioned within the housing between the inlet and outlet, the inlet being in fluid communication with the outlet through the seat;
    a shutoff valve moveably positioned within the housing configured to move between a fuel flow position away from the seat and a fuel shutoff position against the seat; and
    a fuel signal pressure inlet coupled to the shutoff valve, the fuel signal pressure inlet being configured to sense fuel pressure rise from an engine fuel boost pump to urge the shutoff valve from the fuel flow position to the fuel shutoff position.

17. The FRTTV of claim 16, wherein the shutoff valve is configured to move to the fuel shutoff position at approximately 50 psid of sensed fuel pressure rise.

18. The FRTTV of claim 16, further comprising a shutoff valve spring coupled to the shutoff valve, the shutoff valve spring being configured to urge the shutoff valve away from the seat.

19. The FRTTV of claim 16, further comprising a check valve moveably positioned within the housing, the check valve being configured to move between a fuel shutoff position against the seat and a fuel flow position away from the seat.

20. The FRTTV of claim 19, wherein the check valve is positioned on the inlet side of the seat and the shutoff valve is positioned on the outlet side of the seat.

21. The FRTTV of claim 19, wherein the position of the check valve is based on aircraft boost pump fuel flow pressure in the inlet.

22. The FRTTV of claim 19, wherein the check valve is configured to move to the fuel flow position at approximately 17 psig of aircraft boost pump fuel flow pressure.

23. The FRTTV of claim 19, further comprising a check valve spring coupled to the check valve, the check valve spring being configured to urge the check valve toward the seat.

24. The FRTTV of claim 23, wherein the check valve spring provides a 7.5 pound preload on the check valve.

25. The FRTTV of claim 16, further comprising a metering orifice positioned between the shutoff valve and the outlet.

26. The FRTTV of claim 25, wherein the metering orifice is sized to flow 3300 PPH fuel at 15 psid.

27. The FRTTV of claim 25, further comprising a chamber bounded by the shutoff valve and metering orifice.

28. The FRTTV of claim 27, further comprising one or more pressure switches fluidly coupled to the chamber, the one or more pressure switches configured to sense fuel flow in the chamber.

29. A method to automatically turn fuel on and off in a starter/generator (S/G) cooling system having a fuel return to tank valve (FRTTV) coupled to an engine fuel boost pump during engine start, the method comprising;

receiving aircraft boost pump fuel by the FRTTV;

opening the FRRTV based on the aircraft boost pump fuel pressure;

sensing fuel pressure rise from the engine fuel boost pump by the FRTTV; and closing the FRRTV based on the sensed fuel pressure rise.

30. The method of claim 29, wherein the FRRTV includes a check valve and a shutoff valve, and opening the FRRTV is done by the check valve and closing the FRRTV is done by the shutoff valve.

31. The method of claim 30, wherein opening the FRRTV includes moving the check valve from a fuel shutoff position to a fuel flow position.

32. The method of claim 30, wherein the check valve is configured to prevent reverse flow in the heat exchanger fuel system.

33. The method of claim 30, wherein closing the FRRTV includes moving the shutoff valve from a fuel flow position to a fuel shutoff position.

34. The method of claim 30, wherein sensing fuel pressure rise from an engine fuel boost pump by the FRTTV includes a signal pressure inlet coupled to the shutoff valve receiving engine fuel boost pump pressure.

35. The method of claim 30, wherein the shutoff valve is fluidly coupled to the engine fuel boost pump.

36. The method of claim 30, wherein the FRRTV further includes a first spring holding the check valve in a normally closed position.

37. The method of claim 30, wherein the FRRTV further includes a second spring holding the shutoff valve in a normally open position.

38. The method of claim 29, wherein opening the FRRTV is at approximately 17 psig of aircraft boost pump fuel pressure.

39. The method of claim 29, wherein closing the FRRTV is at approximately 50 psid of fuel pressure rise.

* * * * *